Figure 1:
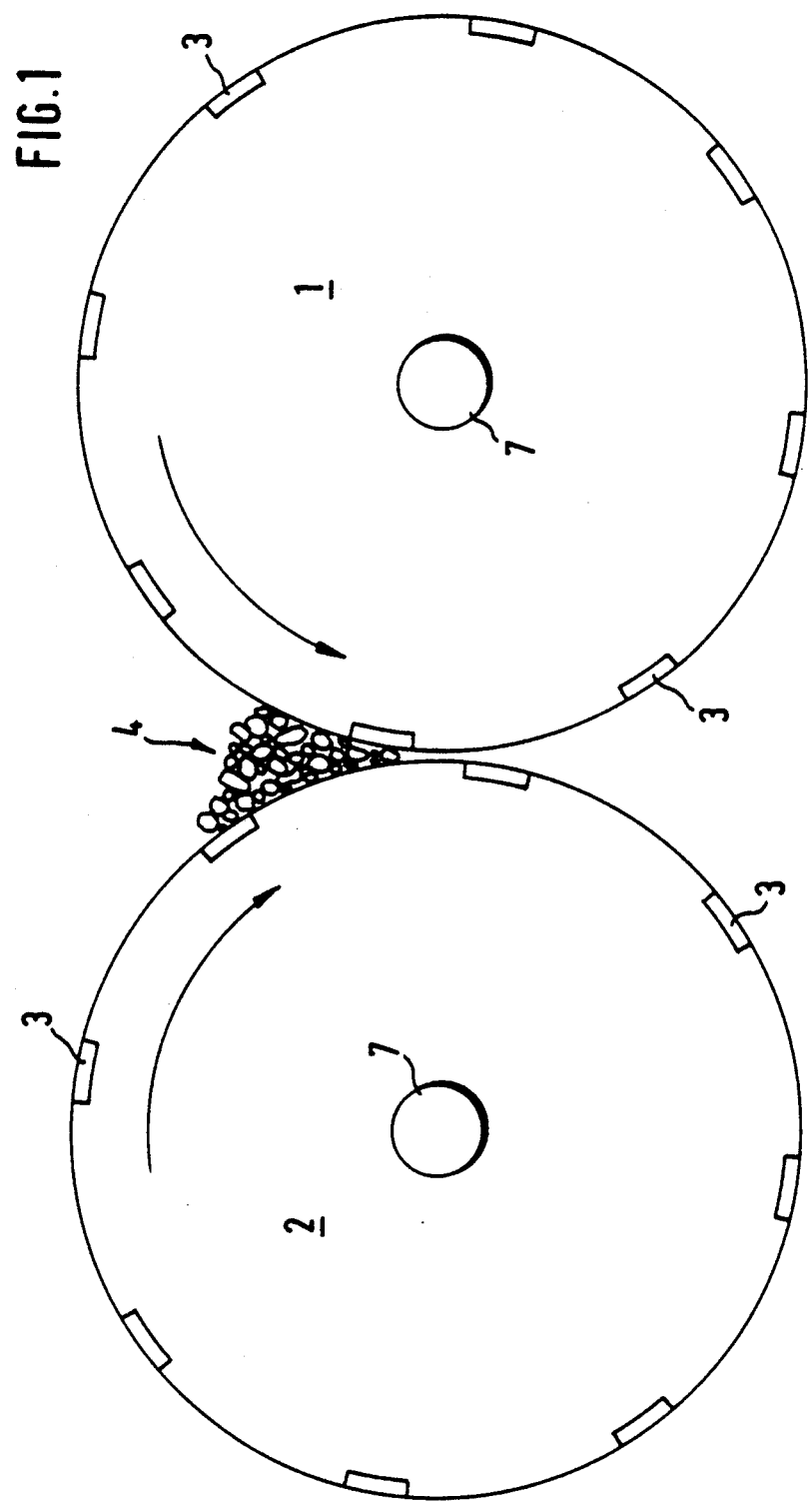

United States Patent [19]

Girmscheid, deceased et al.

[11] Patent Number: 5,061,421
[45] Date of Patent: Oct. 29, 1991

[54] MOLDINGS COMPOSED OF CORDIERITE AND A PROCESS FOR PRODUCING THEM

[75] Inventors: Paul Girmscheid, deceased, late of Lauf, Fed. Rep. of Germany, by Margot L. Girmscheid, née Hermannsdörfer, Ralf A. Girmscheid, Steffen P. Girmscheid, heirs; Helmut Stuhler, Röthenbach; Gisbert Schulze, Lauf, both of Fed. Rep. of Germany

[73] Assignee: Hoechst CeramTec Aktiengesellschaft, Selb, Fed. Rep. of Germany

[21] Appl. No.: 321,401

[22] Filed: Mar. 10, 1989

[30] Foreign Application Priority Data

Mar. 12, 1988 [DE] Fed. Rep. of Germany ....... 3808348

[51] Int. Cl.⁵ ............................................. C04B 35/64
[52] U.S. Cl. ...................................... 264/63; 501/120
[58] Field of Search .................................. 264/63, 120

[56] References Cited

U.S. PATENT DOCUMENTS

| | | | |
|---|---|---|---|
| 3,824,196 | 7/1974 | Benbow et al. | 252/455 |
| 3,885,977 | 5/1975 | Lachman et al. | 106/62 |
| 4,851,376 | 7/1989 | Asami et al. | 264/66 |

Primary Examiner—James Derrington
Attorney, Agent, or Firm—Foley & Lardner

[57] ABSTRACT

For producing moldings composed of cordierite, a batch, which gives the composition of cordierite and contains clay and/or kaolin as well as soapstone and/or talc and also water and an organic aid, is subjected to shear mixing. For this purpose, the batch is placed between 2 bodies, which are at a small distance and move relative to one another, and at the same time the batch is subjected to a shear stress. Preferably, the batch is filled into the gap formed by 2 almost touching cylindrical shear rollers which rotate at different speeds or run in opposite directions. The batch is then deformed to give a molding, and the molding is fired until the cordierite phase is formed.

Cordierite bodies of very low coefficients of thermal expansion (for example at most $1.1 \times 10^{-6}/°C$. in all three spatial directions) can be obtained.

12 Claims, 2 Drawing Sheets

MOLDINGS COMPOSED OF CORDIERITE AND A PROCESS FOR PRODUCING THEM

The present invention relates to moldings composed of cordierite and having a particularly low thermal expansion.

It is known that bodies composed of cordierite have a very low thermal expansion and can therefore be used for bodies where high thermal shock resistance and good spalling resistance are required, for example automobile emission catalysts. An example of the production of a cordierite honeycomb by extrusion is to be found in German Offenlegungsschrift 2,222,468. It is mentioned that aluminas of a layer-type structure and spinels and minerals such as talc and clays are particularly well suited for producing honeycombs and that, in such materials, the weak bonds between the oxide layers are apparently easily broken under the conditions of mixing and/or extrusion. It is also recommended to subject the plastic composition to shear mixing before the extrusion.

According to the teaching of German Auslegeschrift 2,450,071, the batch used for producing a cordierite molding which contains lamellar loam or destratifiable stratified loam, is thoroughly mixed with water and an extrusion aid and formed anisostatically to give a green blank, and the latter is dried and fired.

It has been found that by no means all raw materials (clays) conventionally used for the production of cordierite can be processed to give cordierite moldings having a coefficient of thermal expansion of less than $1.1 \times 10^{-7}/°C$. (in the temperature range from 25° to 1,000° C.) by the process indicated. Although it is alleged that stratified loam would be destratified during mixing, that is to say during intimate thorough mixing of the components of the batch, no method is indicated to enable the degree of destratification to be followed continuously. Neither are there data on the origin of the raw materials.

In any case, as our own experiments have shown, the required low coefficients of thermal expansion can be achieved by conventional processes only when a few selected starting products are used. This applies in particular to clays and kaolins.

A further prerequisite for producing cordierite moldings having a low thermal expansion is, according to German Auslegeschrift 2,450,071, that forming of the green blank is carried out anisostatically. It is said that sliding of the loam lamellae during forming and a parallel arrangement of the lamellae of loam and talc in the green blank take place only in this case. Even though the importance of the destratification step was correctly recognised, no reproducible process is disclosed, by means of which destratification can be achieved regularly and reliably.

In practice, wet drum mixers are used for comminuting ceramic starting components and planetary paddle mixers, typhoon mixers and open-based kneaders are used for mixing.

The invention is based on the recognition that the shear stress in these units is inadequate for optimum disintegration of kaolin or clay into individual lamellae, such as is required for producing cordierite of low thermal expansion.

A process for producing moldings composed of cordierite has now been found, in which a batch, which gives the composition of cordierite and contains clay and/or kaolin as well as soapstone or talc as well as water and an organic aid for deforming the composition, is subjected to shear mixing, the mix is formed to give a molding and the latter is fired until the cordierite phase is formed. This process comprises placing the batch between two bodies, which are at a small distance and move relative to one another, and at the same time subjecting the batch to a shear stress. For example, it is possible to place the batch between two substantially parallel glass plates or steel plates, which are moved relative to one another. It is advantageous when a pressure, in particular pressures of at least 2 bar, is built up between the two bodies, since shearing then takes place more rapidly. The distance of the two bodies is in general 0.1 to 5 mm, preferably 0.3 to 3 mm.

It is advantageous if the batch contains just the quantity of water that a mass which can be kneaded is formed (in most cases 10–20% by weight). Such a mass has in general viscosities of at least 50,000 Pa.s.

In a preferred embodiment of the shear mixing according to the invention, the batch is introduced into the gap formed by two almost touching cylindrical rollers which rotate at different speeds. The greater the difference between the peripheral speeds in the vicinity of the gap, the greater is the shear stress. To ensure that the working time of the mass which is to be sheared is not unduly short, it is advantageous to arrange the two shear rollers horizontally or almost horizontally.

The two shear rollers can have the same direction of rotation. It is preferred, however, if the two shear rollers rotate in opposite directions (but have different speeds of rotation).

The shear effect is improved if the two rollers have shear grooves which preferably run like a screw thread at constant pitch angle around the shell of the cylinders. It is also possible to provide a plurality of mutually parallel shear grooves. The roller distance is preferably less than 1.5 mm on the charge side. The distance on the discharge side should preferably be at least equal to (or greater than) the distance on the charge side. The grooves on the rollers accomplish the transport of the mass over the rollers and also contribute to destratification.

It is preferred if the two rollers of the roll mill are located side by side without intermeshing.

The actual destratification is effected at the roller nip by the shear which is caused by the different roller speeds and the resulting back-up of mass. Such large forces are here exerted via the roller drives that even relatively small agglomerates of kaolin, clay or soapstone are disintegrated and can then be homogenized with the other batch constituents. Lamellar minerals, such as clay, kaolin or talc, arrange themselves in such a way that the lamellae planes are parallel to one another and parallel to the roller surface. Until just before the shearing step, the perpendiculars on the surfaces of the lamellar minerals point to the roller axis; after the mass has been taken off from the roller, ribbons are formed in which the lamellar mineral particles are likewise predominantly arranged parallel to one another and parallel to the ribbon surface.

A further variant of thorough shear mixing is to place the batch into the gap formed by two circular disks which are arranged concentrically and rotate relative to one another. Preferably, the disks are arranged horizontally. Suitable disk materials are hard metals such as steel. The shear proceeds particularly rapidly if one or more grooves have been built into at least one of the disks. These grooves can be arranged symmetrically to the axis of rotation. Their shape is not critical; they can run in a straight line or be curved, for example in a helical form. Preferably, the grooves extend from the zone near to the axis of rotation up to the outer periphery. In the case of horizontal arrangement, the batch is filled in through an orifice in the topmost disk near to the axis of rotation and taken off at the disk periphery. The distance between the disks should be about 0.5–10 mm.

It has been found that the disintegration of the lamellae by the process according to the invention proceeds very rapidly and that, thus, even batches of poorly destratifiable kaolin, which usually cannot be satisfactorily processed, can readily be processed to give products of low coefficient of thermal expansion. Kneading in a mixer is here not necessary.

The polycrystalline, sintered cordierite ceramic which can be produced from these masses contains in general, on an analytical oxide basis, 48 to 52% by weight of $SiO_2$, 34 to 41% of $Al_2O_3$ and 12 to 18% of MgO. Contents of 48.0 to 51.6% of $SiO_2$, 34.2 to 39.5% of $Al_2O_3$ and 12.5 to 15.5% of MgO are preferred.

For the first time, it is possible by means of the process according to the invention to produce polycrystalline sintered cordierite bodies which have a coefficient of thermal expansion of not more than $1.1 \times 10^{-6}$/°C. in the temperature range from 20° to 1000° C. not only in one direction but in all three (mutually perpendicular) directions.

With the use of starting products, which are either difficult or easy to destratify, and with thorough shearing up to complete disagglomeration of the primary crystals, moldings can be obtained which have coefficients of thermal expansion from 0.6 to $1.1 \times 10^{-6}$/°C. in the temperature range from 20° to 1,000° C. in all three (mutually perpendicular) directions. The disagglomeration can be observed under the scanning electron microscope.

The composition of the batch (without allowing for the organic constituents and water) does not play a decisive role here, provided only that the analytical oxide composition indicated above is adhered to. The lowest possible content of alkalis and alkaline earths is also desirable, in particular contents of less than 1.5% (total of $Na_2O + K_2O + CaO$).

The forced homogenization in the abovementioned shear roll mill makes it possible, on the one hand, to disintegrate the mineral particles into many small lamellae and, on the other hand, uniformly to distribute all the constituents in the mass, also including the organic constituents which serve for plasticizing, that is to say which confer increased plastic deformability on the raw material and strength on the molding in the dried state. Possible organic plasticizing constituents are, inter alia, cellulose ethers, such as methylcellulose, as binders and, inter alia, boiled starch. The destratification results in an increase of the active surface area and hence in a greater water requirement. After the forced homogenization, the yield stress of the masses is increased by about 10%. This can be advantageous for the plasticity of the masses (cf. W. Schulle and R. Bartusch, Keramische Zeitschrift 36 (1984) No. 10, page 525). It is also possible, however, to reduce the viscosity again by an increased addition of water.

The yield stress and the plasticity of the treated masses are the higher, the better the destratification of the starting products has been. After treatment on a shear roller mill, masses can be obtained which are particularly suitable for producing delicate, structured ceramics, for example for producing honeycombs by extrusion. The lower the extrusion rate under otherwise identical conditions (composition, extrusion pressure), the more successful was the destratification of the starting crystallites. The essential point for the success of the process according to the invention is the destratification during the forced homogenization. The favorable influence of the process according to the invention in the production of isostatically pressed cylinders can be seen from Table 4, and the influence in the extrusion of honeycombs is clear from Table 3.

Although an alignment of the particles during the shaping of the green blank is advantageous for the process according to the invention, it is not absolutely necessary. As Table 4 shows isostatically pressed cylinders of low coefficient of thermal expansion can also be produced. It is surprising that moldings having a low coefficient of thermal expansion can be produced by isostatic pressing from batches which were prepared by the process according to the invention.

For isostatic pressing, masses are used which have been fully disagglomerated. The water content of these masses is in general between 0 and 5% by weight. By means of isostatic pressing, moldings can be produced, the coefficients of thermal expansion of which are substantially identical in all three spatial directions (relative deviation from the mean of the 3 directions at most 3%) and are in the range from $0.6–1.1 \times 10^{-6}$/°C. (measured in the interval from 20° to 1,000° C.).

Ceramic masses which have been treated according to the invention have an increased plasticity, so that especially those ceramic parts can be advantageously produced, for which there is otherwise a risk of deformation in the green state.

The invention is explained in more detail by the Examples.

EXAMPLES

Example 1 a) Experimental apparatus

Figure 2:
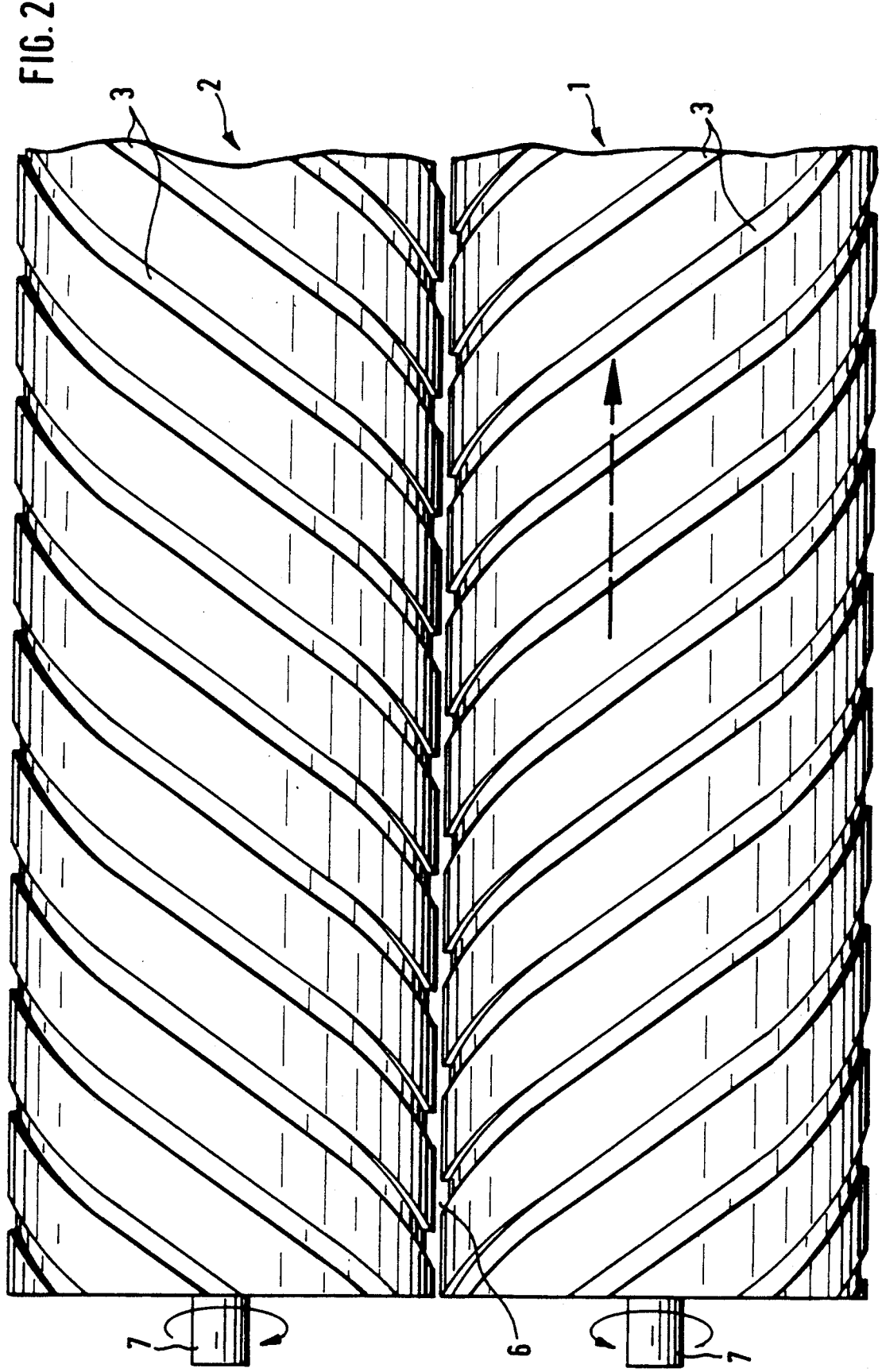

A roller mill according to FIGS. 1 and 2 was used. FIG. 1 shows the roller arrangement in cross-section. Two shear rollers (1, 2) arranged horizontally side by side run in opposite directions at different speeds and thus transport the product (4) from the charge side to the discharge side. The roller diameter is 100 mm, and the length of the rollers is 600 mm.

Grooves (3) are milled at spacings of 3 cm into the roller surface. In projection, the direction of the grooves forms an angle of about 45° with the direction of the axis. The depth of the grooves is 2 mm and their width is 8 mm. The distance of the two rollers was set to 1.0 mm on the charge side and to 1.5 mm on the discharge side. The mounting of the axes (7) is not shown in the drawing. FIG. 2 shows the two horizontal rollers seen from above. The batch is charged into the gap near to one end of the rollers, approximately at position (6). The batch then migrates in the direction of the arrow.

b) Experimental masses

Ceramic masses were produced by mixing from soapstone, kaolin, alumina and clay. The oxide composition of the raw materials used (data in percent by weight) is to be found in Table 1. Table 2 shows the quantities of which the individual raw materials of the batches A to H are composed. The clay used is very easy to destratify. By contrast the kaolin 1 used in batch B is rather difficult to destratify.

The calculated oxide composition (in percent by weight) of the ceramic bodies obtained by firing from the batches according to Table 2 is to be found in Table 2a.

c) Forming to give honeycombs

The masses of Table 2 were destratified once in the experimental apparatus. They were then extruded by means of a piston press (180 bar) to give honeycombs (diameter 100 mm). The honeycombs were dried and fired for 10 hours at 1,400° C. The coefficients of thermal expansion of the honeycombs were then determined in the direction of the extrusion axis. These coefficients of thermal expansion are listed in Table 3 ("after").

Example 2 (Comparison example)

The masses according to Table 2 were mixed in a twin Z-kneader for twice and three times the kneading time (relative to the normal treatment time of 3 hours) and, under otherwise the same conditions as in Example 1c), the masses were formed into honeycombs and fired. The coefficients of thermal expansion (in the direction of extrusion) were likewise determined and are to be found in Table 3 ("before").

It is found that a marked improvement in the coefficients of thermal expansion was obtained by the treatment according to the invention, even though this depended on the nature of the samples. The relatively large improvement in the coefficient of thermal expansion of batch D with a high proportion of easily destratifiable clay is surprising.

Example 3

The masses of Table 2 were destratified once in the experimental apparatus. The destratified masses (moisture content 1% by weight) were isostatically pressed to give cylinders diameter 7 cm, length 15 cm) by means of an isostatically operating press at a pressure of 1,200 bar. The cylinders were dried and fired at 1,420° C. The coefficients of thermal expansion of the test specimens (temperature range from 20° to 1,000° C.) were determined in the three spatial directions. (Axial direction and two mutually perpendicular directions perpendicular to the axial direction). The values found are given in Table 4 (samples A* and B*).

Example 4 (Comparison example)

For comparison with Example 3, the masses according to Example 1b were mixed for three hours in a twin Z-kneader and the masses were processed in the same way to give sample cylinders. The coefficients of thermal expansion determined are to be found in Table 4 (samples A and B).

When comparing the values in Table 4 (A with B and A* with B*), it is seen that the treatment according to the invention leads to a considerable improvement in the coefficients of thermal expansion also in the case of isostatic pressing.

Example 5

The batch E from Table 2 was treated in the experimental apparatus of Example 1. Samples were taken at various points along the rollers, in order to investigate the influence of the effective roller lengths on the properties of the masses treated. Some of the masses were also passed more than once through the apparatus, in order to increase the effective roller length in this way. However, it was found that, when the treatment (roller length 60 cm) is repeated, the resulting coefficients of thermal expansion can then be improved only slightly.

TABLE 1

| Raw material analysis | | | | | |
|---|---|---|---|---|---|
| | $SiO_2$ | $Al_2O_3$ | MgO | CaO | $K_2O + Na_2O$ |
| Soapstone 1 | 60.4 | 0.1 | 32.2 | 0.2 | 0.02 |
| Soapstone 2 | 60.5 | 1.0 | 33.0 | 0.05 | 0.09 |
| Kaolin 1 | 45.0 | 39.0 | 0.05 | 0.03 | 0.15 |
| Kaolin 2 | 45.5 | 39.0 | 0.05 | 0.1 | 0.20 |
| Kaolin 3 | 47.1 | 37.7 | 0.22 | 0.07 | 1.12 |
| Clay | 46.3 | 35.4 | 0.22 | 0.70 | 0.10 |
| Hydrated alumina | 0.04 | 64.7 | — | — | 0.35 |
| Alumina | 0.08 | 99.6 | — | 0.04 | 0.24 |
| Silica | 98.8 | 0.8 | — | 0.1 | 0.08 |

TABLE 2

| Composition in % by weight | | | | | | | | |
|---|---|---|---|---|---|---|---|---|
| | D | C | B | E | A | F | G | H |
| Soapstone 1 | 38.2 | 38.2 | 38.2 | 35.0 | 38.2 | — | 18.0 | 38.2 |
| Soapstone 2 | — | — | — | — | — | 37.0 | 20.0 | — |
| Kaolin 1 | 19.2 | 19.2 | 19.2 | 26.3 | 14.5 | 20.0 | 20.0 | 20.0 |
| Kaolin 2 | — | — | — | 9.6 | 20.0 | 20.0 | 20.0 | 20.0 |
| Kaolin 3 | — | 5.0 | 9.5 | — | 4.8 | — | — | — |
| Clay | 14.0 | 9.5 | 5.0 | 4.4 | 4.8 | 7.0 | 7.0 | 7.0 |
| Hydrated alumina | — | — | — | — | — | 16.0 | 15.0 | 15.0 |
| Alumina | 20.0 | 20.0 | 20.0 | 27.4 | 20.0 | — | — | — |
| Silica | 7.7 | 8.0 | 8.4 | 7.3 | 8.1 | — | — | — |
| Cellulose ether | 3.0 | 4.0 | 4.0 | 4.0 | 4.0 | 4.0 | 4.0 | 4.0 |
| Diglycol monoester of coconut fatty acid | 0.5 | 0.5 | 0.5 | 0.5 | 0.5 | 0.5 | 0.5 | 0.5 |
| | 29.5 | 29.5 | 29.5 | 29.0 | 29.5 | 29.0 | 29.0 | 29.5 |
| Water | 29.5 | 29.5 | 29.5 | 29.0 | 29.5 | 29.0 | 29.0 | 29.5 |

TABLE 2a

| Calculated oxide composition of the bodies (% by weight) | | | | |
|---|---|---|---|---|
| | D | C | B | E |
| $Al_2O_3$ | 35.70 | 35.68 | 35.58 | 42.15 |
| $SiO_2$ | 50.39 | 50.52 | 50.68 | 45.43 |
| MgO | 13.57 | 13.44 | 13.36 | 12.14 |
| CaO | 0.21 | 0.18 | 0.15 | 0.13 |
| $(Na,K)_2O$ | 0.15 | 0.17 | 0.22 | 0.13 |
| | F | G | H | A |
| $Al_2O_3$ | 33.86 | 32.93 | 32.85 | 35.77 |
| $SiO_2$ | 51.42 | 52.15 | 52.31 | 50.48 |
| MgO | 14.39 | 14.62 | 14.49 | 13.40 |
| CaO | 0.11 | 0.14 | 0.17 | 0.15 |
| $(Na,K)_2O$ | 0.19 | 0.17 | 0.16 | 0.17 |

TABLE 3

| Coefficients of thermal expansion of the batches before and after treatment according to the invention (20–1,000° C.) | | | | | | | | |
|---|---|---|---|---|---|---|---|---|
| | D | C | B | E | A | F | G | H |
| before | $0.85 \times 10^{-6}/K$ | 0.95 | 0.95 | 1.20 | 1.05 | 1.25 | 1.16 | 1.09 |
| after | 0.66 | 0.77 | 0.74 | 0.60 | 0.81 | 0.88 | 0.79 | 0.69 |

TABLE 4

| Coefficients of thermal expansion (20–1,000° C.) of isostatically pressed cylinders | | | | |
|---|---|---|---|---|
| Measurement | A | A* | B | B* |
| in the axial | $1.22 \times 10^{-6}/K$ | 0.93 | 1.21 | 1.04 |

TABLE 4-continued

| Coefficients of thermal expansion (20–1,000° C.) of isostatically pressed cylinders | | | | |
|---|---|---|---|---|
| Measurement | A | A* | B | B* |
| direction (=Z) | | | | |
| perpendicular to Z (=X) | 1.18 | 0.95 | 1.20 | 1.08 |
| perpendicular to Z and X | 1.20 | 0.87 | 1.23 | 1.02 |

We claim:

1. A process for producing cordierite molding, comprising the steps of:
   (a) forming a batch having at least one first mineral component selected from the group consisting of clay and kaolin, at least one second mineral component selected from the group consisting of soapstone and talc, water and an organic deforming aid;
   (b) subjecting the batch to a shear stress sufficient to destratify the mineral components by passing the batch through a gap formed by two almost-touching cylindrical shear rollers which rotate at different speeds;
   (c) forming the resultant destratified mixture into a molding; and then
   (d) firing the molding until a cordierite phase is formed.

2. The process as claimed in claim 1, wherein the batch contains such a quantity of water that the mass can be kneaded.

3. The process as claimed in claim 1, wherein the shear rollers are arranged horizontally.

4. The processed as claimed in claim 1, wherein the two shear rollers run in opposite directions.

5. The process as claimed in claim 1, wherein the two shear rollers have shear grooves which run like a screw thread at constant pitch angle around the shell of the cylinders.

6. The process as claimed in claim 5, wherein the two rollers are located side by side without intermeshing.

7. The process as claimed in claim 1, wherein step (c) comprises isostatically pressing the destratified mixture into a molding.

8. A process of producing cordierite molding, comprising the steps of:
   (a) forming a batch having at least one first mineral component selected from the group consisting of clay and kaolin, at least one second mineral component selected from the group consisting of soapstone and talc, water and an organic deforming aid;
   (b) subjecting the batch to a shear stress sufficient to destratify the mineral components by passing the batch through a gap formed by two rotating, concentrically arranged circular disks;
   (c) forming the resultant destratified mixture into a molding; and then
   (d) firing the molding until a cordierite phase is formed.

9. The process as claimed in claim 8, wherein the batch contains such a quantity of water that the mass can be kneaded.

10. The process as claimed in claim 8, wherein step (c) comprises isostatically pressing the destratified mixture into a molding.

11. The process as claimed in claim 1, wherein, during step (b), the two cylindrical shear rollers exert a pressure of at least 2 on the batch.

12. The process as claimed in claim 8, wherein, during step (b), the two circular disks exert a pressure of at least 2 bar on the batch.

* * * * *